J. E. MITCHELL.
MACHINE FOR CUTTING PIECED LIFTS AND FOR BUILDING LOGS OR HEEL BLANKS THEREFROM.
APPLICATION FILED SEPT. 30, 1916.
1,252,136.
Patented Jan. 1, 1918.
3 SHEETS—SHEET 1.
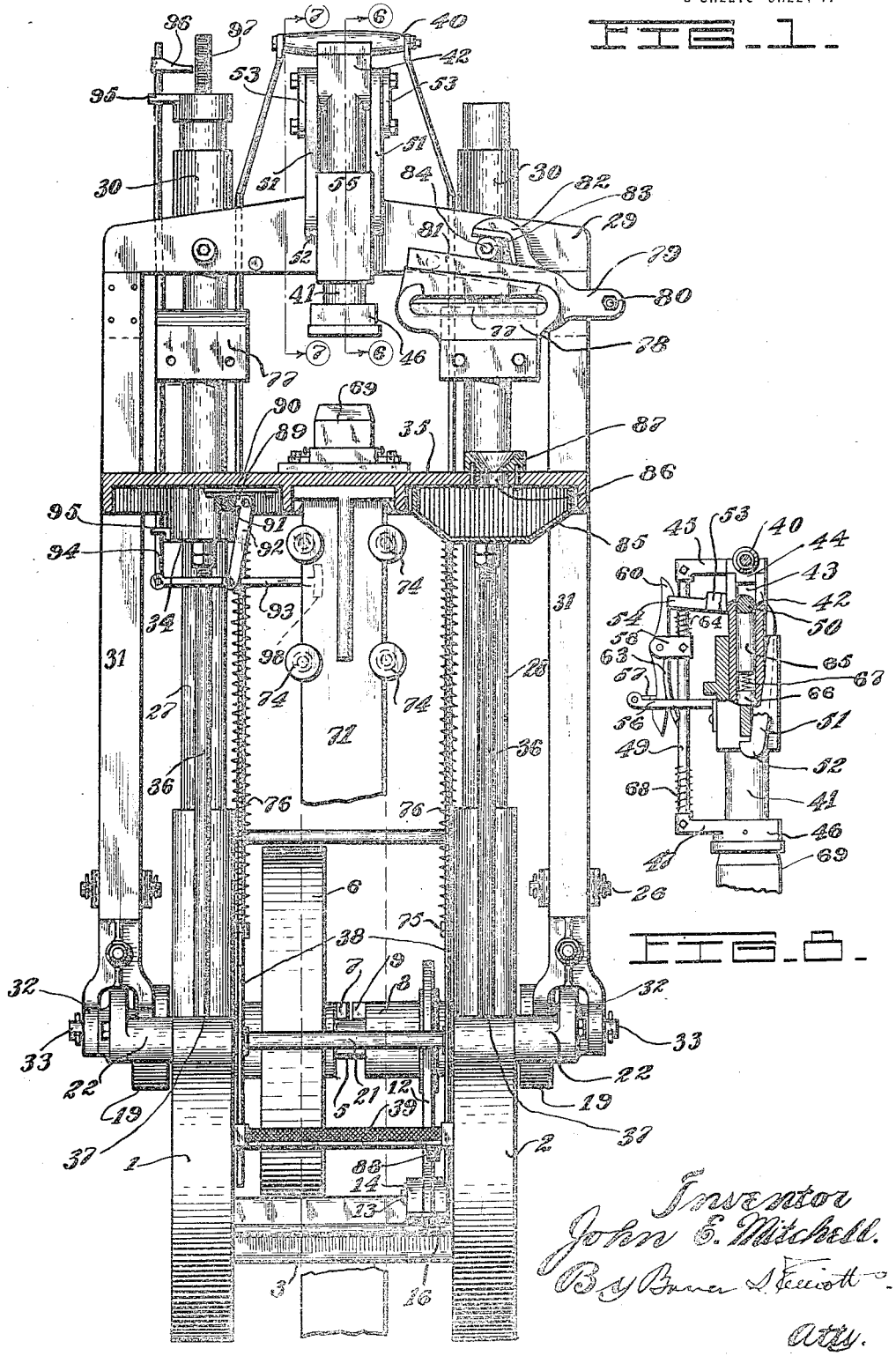

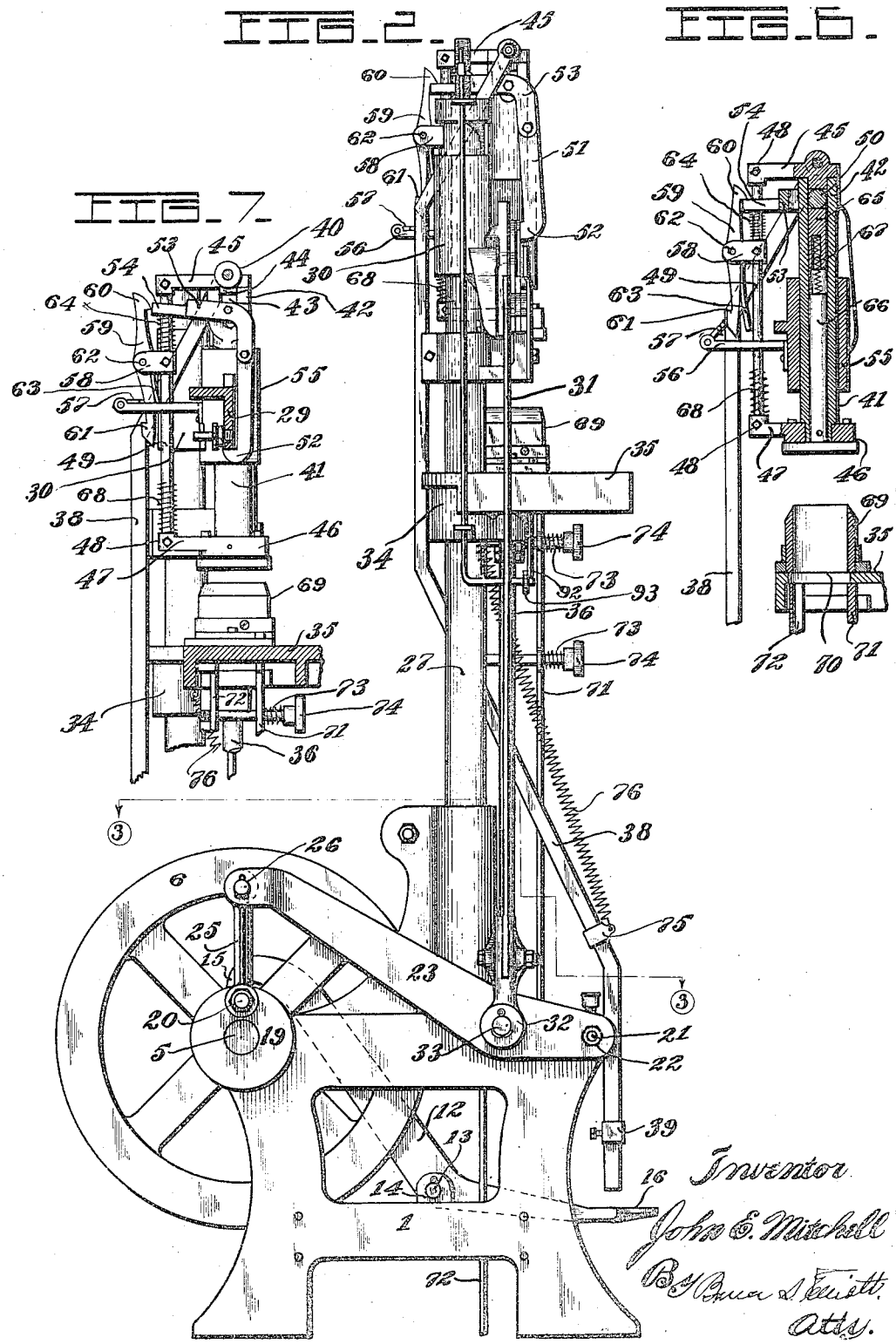

J. E. MITCHELL.
MACHINE FOR CUTTING PIECED LIFTS AND FOR BUILDING LOGS OR HEEL BLANKS THEREFROM.
APPLICATION FILED SEPT. 30, 1916.
1,252,136.
Patented Jan. 1, 1918.
3 SHEETS—SHEET 3.
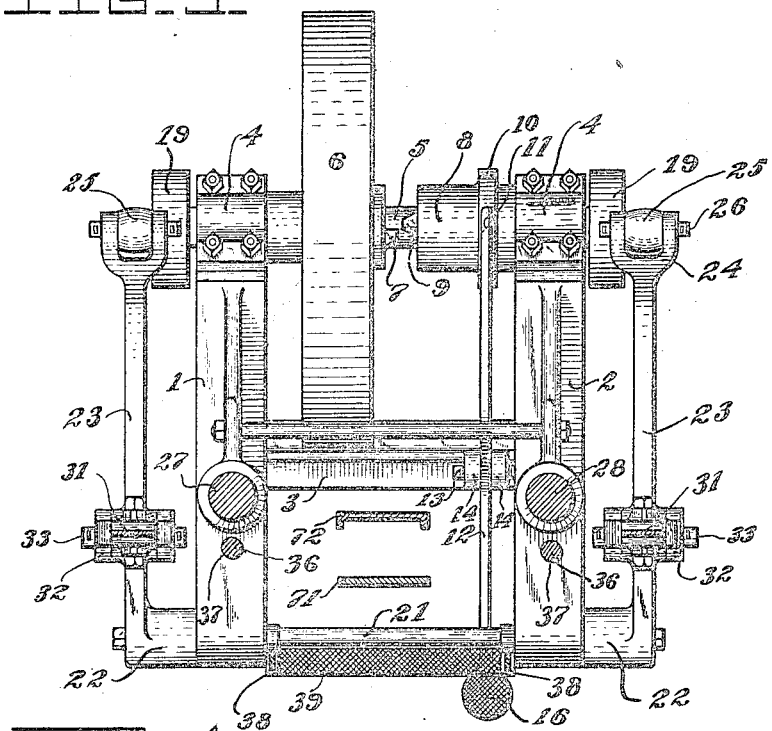
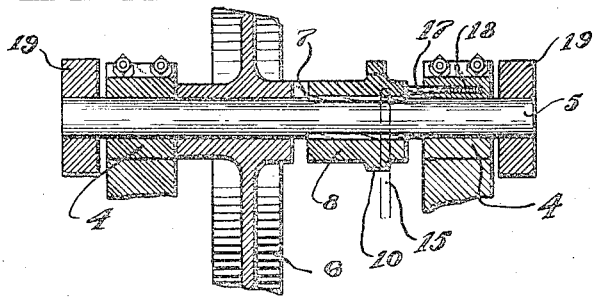
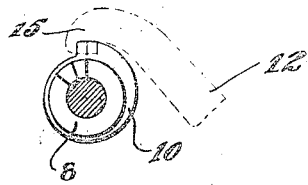

UNITED STATES PATENT OFFICE.

JOHN E. MITCHELL, OF ST. LOUIS, MISSOURI.

MACHINE FOR CUTTING PIECED LIFTS AND FOR BUILDING LOGS OR HEEL-BLANKS THEREFROM.

1,252,136.

Specification of Letters Patent.

Patented Jan. 1, 1918.

Application filed September 30, 1916. Serial No. 122,984.

*To all whom it may concern:*

Be it known that I, JOHN E. MITCHELL, a citizen of the United States, residing in the city of St. Louis and State of Missouri, have invented new and useful Improvements in Machines for Cutting Pieced Lifts and for Building Logs or Heel-Blanks Therefrom, of which the following is a specification.

This invention relates to the art of heel building, and has for its general object to provide a novel machine for cutting lifts, preferably of the type known as pieced lifts, and for building heel blanks, or, if desired, what are known as "logs", therefrom in a continuous operation. The present machine embodies many of the features of invention characteristic of the machine forming the subject-matter of Letters-Patent No. 1,167,107, granted to Dennis Parks January 4th, 1916. This machine of the prior patent was intended more particularly for building separated heel-blanks, and it is not adapted to building heel logs of indefinite length for the reason that the organization of the machine is such that the main drive shaft and other parts would interfere with the projection of the heel log for any very considerable distance below the upper part of the machine supporting the cutting die.

One of the principal objects of the present invention, therefore, is to devise a machine so organized that while it embodies the advantages of the said patented machine it will also permit of the building therein of heel logs of indefinite length.

With the above general object in view the invention is characterized by a machine having the lift cutting features of the patented machine, but organized to present an unobstructed path from the die to the base of the machine, and through the floor on which the machine is supported, if desired, to accommodate a holder in which a log may be built up and through which it may be continuously forced; or, otherwise, for the passage of the log itself in such path should the holder terminate short of the base of the machine.

In addition to the above general object, the present invention also has for its object an improvement in the method of operating the straight-edging implement whereby the same may be actuated when desired, instead of being continuously actuated, as in the prior construction. A still further object of the present invention is to provide means for reciprocating the actuator for the cutting block at the will of the operator, instead of continuously.

A still further object of my invention is the provision of clutch mechanism coördinated with the shaft from which the shear and the cutting-block actuator are operated, whereby the machine is caused to automatically operate in stages instead of continuously, as heretofore; and, finally, a further object of the invention consists in so organizing the parts that the clutch mechanism may be released by the means employed for lowering the cutting block into the position where it will be reciprocated by the cutting block actuator.

In the accompanying drawing—

Figure 1 is a view partly in front elevation and partly in section of a machine constructed according to my invention, one of the shears, that at the left of the machine, being removed;

Fig. 2 is a view in side elevation;

Fig. 3 is a sectional plan view;

Fig. 4 is a sectional view on the line of the main drive shaft illustrating details of the clutch mechanism;

Fig. 5 is a cross sectional view through the main drive shaft illustrating the relation between a cam shoulder on the clutch and a combined releasing and locking lever for the clutch.

Fig. 6 is a section on the line 6—6 of Fig. 1;

Fig. 7 is a section on the line 7—7 of Fig. 1, but showing the cutting block depressed and the actuating dogs in engagement with a reciprocable member actuating the cutting block; and Fig. 8 is a view partly on the line 6—6 and partly on the line 7—7 of Fig. 1, but showing the position of the parts after the cutting block has been depressed, and the cross head, or reciprocable member, raised out of engagement with the catches.

In the drawings the numerals 1, 2, indicate two side frame members united by suitable cross members, such as indicated at 3. Journaled in suitable bearings 4 on the respective frame members 1, 2, and at the rear thereof, as shown in Figs. 2 and 3, is a driving shaft 5 on which is loosely mounted a pulley 6, which is adapted to be driven by a suitable belt, not shown. I prefer to provide a one-revolution clutch. For this purpose, on the hub of the pulley 6 at one side thereof is a clutch tooth 7. Splined on the shaft 5 is a clutch member 8 carrying a clutch tooth 9. Surrounding the clutch member 8 is a cam ring 10 having a cam face 11, (see Fig. 3). The numeral 12 indicates a lever which is pivotally mounted by means of a pin 13 between lugs 14 mounted on the frame of the machine, and provided with an outer curved end 15 which is provided with an inclined face adapted to engage the cam face 11 of the ring 10. The end 15 normally rests in this position by gravity. At its opposite end the lever 12 is provided with a treadle 16 by means of which it may be depressed to release engagement of the end 15 with the cam face 11. Mounted in the bearing 4 adjacent the outer end of the clutch member 8 is a pin 17 which is normally pressed outward by a spring 18 into engagement with the end of the clutch member 8. When the treadle 16 is depressed the end 15 of the lever 12 is raised out of engagement with the cam face 11 and the pin 17 under pressure of the spring 18 throws the clutch member 8 toward the pulley 6 so that the clutch tooth 7 will engage with the clutch tooth 9. When this occurs the shaft 5 will be revolved by the pulley 6, owing to the fact that the clutch member 8 is splined on the shaft. As soon as the treadle 16 has been depressed the operator releases his foot therefrom and the end 15 falls upon the ring 10 and rides thereon until the cam face 11 again engages the inclined face of the end 15 of the lever 12 which causes the clutch member 8 to be moved away from the pulley 6, as shown in Fig. 3, to disengage the clutch tooth 9 from the clutch tooth 7 when the rotation of the shaft 5 will stop. The end 15 of the lever 12 passes slightly behind the cam ring 10 in the position shown in Fig. 3, and thus holds the clutch member 8 in its retracted position against the pressure of the spring 18. By this means the operator can secure single rotations of the shaft 5 at such times as he may desire to operate the mechanism hereinafter referred to. Secured on either end of the shaft 5 is a crank wheel 19 provided with a crank pin 20. Mounted in and projecting beyond the outer sides of the frame members 1, 2, and extending between said frame members is a rod 21 on either projecting end of which is pivotally mounted a bearing 22 formed at the outer ends of two similar throw levers 23. Each of these throw levers is bifurcated at its inner end, as indicated at 24 in Fig. 3, to receive the upper end of a connecting rod 25 which is pivotally secured in this position by a pin 26. The lower end of each connecting rod 25 is pivotally mounted on the crank pin 20. Mounted on and extending upward from the opposite frame members 1 and 2 are two columns 27 and 28. The numeral 29 indicates a reciprocable member in the form of cross-head which is provided with sleeves or bearings 30 slidably mounted on the upper end portions of the columns 27 and 28. At either end the cross-head 29 has secured to it the upper ends of connecting rods 31, the lower ends of which have heads 32, attached respectively to pins 33 on the sides of the throw levers 23. Secured on the columns 27 and 28 are supports 34 on which is mounted a table 35, the supports 34 being braced by posts 36 extending down and supported below at 37 on the side frames 1 and 2. I provide a manually operated part in the form of a treadle frame comprising two offset pull bars 38, the lower portions of which are connected by a foot piece or foot bar 39. The upper ends of the pull bars 38 are connected by a cross piece 40. Slidably mounted in the cross-head 29 and centrally thereof is a depressible member in the form of a vertically-disposed plunger 41 (see Figs. 6 and 8) the upper end of which is provided with a rectangular head 42. The plunger 41 is hollow, and the head 42 thereof is provided at opposite sides with a slot 43, the top of the head 42 having secured thereon a stop block 44 to which is secured the cross piece 40 before referred to. Extending rearward from the stop block 44 is an arm 45.

Mounted on the lower end of the plunger 41 is a cutting block 46, extending rearward from which is an arm 47. I provide automatic interlocking means for automatically interlocking the cutting block with the cross-head at will. For this purpose the arms 45 and 47 are provided at their free ends with socket members 48 in which are secured the opposite ends of a rod 49. Pivotally and slidably mounted in the slots 43 of the head 42 is a cross pin 50 to which are secured at opposite ends the upper ends of two catches 51, each of which is provided at its lower end with a hook 52. The numeral 53 (Figs. 6, 7, and 8) indicates a U-shaped bail, the legs of which are secured to the sides of the respective catches 51. Extending rearward from the central portion of the bail 53 is a tongue or arm 54, which is provided with an elongated aperture loosely surrounding the rod 49. The cross-head 29 is provided centrally of its length with a rectangular portion or guide 55 in which is provided a bearing for the plunger 41. The catches 51 slidably engage opposite sides of the guide 55. Secured on and extending rearward from the guide 55 is a bracket 56 having pivotally mounted on its outer end a latch 57 which normally rests upon the upper surface of the bracket but is freely movable in an upward direction. The numeral 58 indicates a U-shaped clip which is secured on the rod 49 and has pivotally mounted between its free ends a double dog 59 having an inward-directed hook 60 at its upper end and an outward-directed hook 61 at its lower end, the double dog being pivotally mounted about centrally of its length, as indicated at 62. A leaf spring 63 mounted in the clip 58 and bearing at its free end against the rod 49 tends normally to force the lower end portion of the dog 59 outward and to hold the hook 60 at its upper end in engagement with the tongue 54 of the bail 53. In its normal position the lower hooked end 61 of the dog 59 occupies a position above the latch 57, as indicated in Fig. 2. The bracket 56 is slotted to permit the passage therethrough of the rod 49 and the lower portion of the spring 63 and dog 59. Interposed between the clip 58 and the tongue 54 is a coil spring 64 which is normally under compression so that it will operate to force the tongue or arm 54 upward and thereby move the catches 51 inward or toward the cross-head when the hook 60 of the double dog 59 is released from engagement with said arm 54. Slidably mounted in the plunger 41 is a lift pin 65. Extending upward into the plunger 41 is a rod 66, and a coil spring 67, the upper portion of which is housed in the lift pin 65, extends between the upper end of the rod 66 and said lift pin, and tends normally to force the upper end of the latter against the cross pin 50 to lift the same and thereby raise the catches 51.

A buffer spring 68 encircles the lower end portion of the rod 49, being supported on the lower socket 48, and is adapted to engage the under side of the bracket 56 in the upward movement of the plunger 41, as presently referred to.

Mounted on the work table 35 is a die 69 which is immediately under and coaxial with the cutting block 46. An opening 70 is provided through the table; and arranged about opposite sides of this opening, and extending downward in axial alinement with said die and block, is a straight holder for receiving the lifts that are cut and forced down through the die 69, said holder comprising a breast-plate 71 and a back-plate 72, the breast-plate 71 being held in yieldable relation with the back-plate 72 by means of springs 73 (see Fig. 2) interposed between said plate and the heads of the hand-screws 74. By turning these screws the proper adjustment of the breast-plate with reference to the back-plate may be secured. This holder is fully described in connection with a machine having the same general object in view as the present invention, and forming the subject-matter for patent, Ser. No. 879,858, filed December 31st, 1914, filed by William Wolfe and Dennis Parks as joint inventors.

Evidently the levers 23 and associated mechanism constitute a mechanism for actuating the cross-head 29, and the parts of this mechanism are located to one side of the holder so that the holder can conduct the log uninterruptedly from the machine, and in a line extending past and to one side of the shaft 5.

Connected at its lower end to the lower end portion of each pull rod 38, as indicated at 75, Fig. 2, is a coil spring 76, the upper ends of said coil springs being secured respectively to the supports 34. These springs operate to raise the treadle bar 39 after it has been depressed, and consequently will raise the plunger 41 when pressure on the foot bar 39 is released. Mounted on each of the columns 27 and 28 is a fixed cutter 77 shown at the left of Fig. 1, and secured to this cutter is a guard 78, shown at the right of Fig. 1, having an arm 79 on which is pivotally mounted at 80 one end of a blade 81. Each blade 81 has projecting from its upper side a bracket arm 82 which engages over a roller 83 mounted on a stud 84 on the cross-head 29. Supported on the under side of the work table 35 at the right-hand side thereof is a paste pot 85, the table being provided with an aperture 86 communicating with the paste pot. Secured on the table 35 over this opening is a suitable mouth piece 87 having a tapered opening leading to the opening 86 to permit ready entrance of a brush to the paste pot and the return of excess paste carried up by the brush to the paste pot.

The operation of the device as thus far described is as follows:

By the depression of the treadle 16 the clutch member 8 is moved toward the left by the pin 17 and spring 18, (see Fig 4) so that the teeth 7 and 9 interlock. Then the shaft 5 will be rotated by the continuously running pulley, and through the connecting rods 25 the levers 23 will be rocked. The movement of the levers 23 is imparted through the members 31 to the cross-head 29. Whenever the cross-head moves, movement is imparted to the blades 81. The operator will have a quantity of stock in the form of sheets and scrap leather on the work table 35, and selecting pieces of the scrap leather he inserts them in the cutters to give them a straight edge. These pieces are assembled on top of the die 69, and initially a whole piece of leather is first placed on top of the die and cut into it by the cutting block to form a support for the scraps of leather as they are being assembled over the die. Having assembled the scraps to form a three-piece lift, the operator then presses down on the foot piece 39 which, through the medium of the pull rods 38, depresses the depressible member, that is, he lowers the plunger 41, and the parts connected to or mounted thereon. As the plunger descends the first operation which occurs is the contact of the hook 61 of the double dog 59 with the latch 57. By this contact the lower end of said double dog will be pressed inward as the hook 61 passes by the latch 57, and the hook 60 will be thrown out of engagement with the arm 54. This position of the parts is shown in Fig. 7. As soon as the arm 54 is released the spring 64 is free to exert its power to move said arm upward. As the plunger 41 is lowered the catches 51 are lowered with it until their hooks 52 will be below the lower edge of the cross-head 29. The spring 64 will then throw the arm 54 upward and force the hooks 52 under the lower edge of the cross-head 29, this position of the parts being shown in Fig. 7. This interlocks the plunger 41 with the cross-head 29. In the latter part of the downward movement of the foot piece 39 a projection 88 on the under side of the foot piece 39 engages the treadle 16, and this operates to actuate the lever 12 which permits the clutch to close automatically and enable the pulley 6 to rotate the shaft. As the cross-head descends it will carry the catches 51 down with it, drawing down the cross pin 50 to the bottom of the slot 43, which then causes the plunger 41 to be drawn down to carry the cutting block 46 into engagement with the top of the die 69, in which operation the leather pieces on the top of said die will be cut through by the die, the excess falling off and the three-pieced lift remaining in the die. In the downward movement of the catches 51 the cross pin 50 pushes down the slide pin 65 against the resistance of the spring 67. As the catches 51 and the plunger 41 are thus drawn downward by the cross-head 29 the arm 54 will be moved below the hook 60 which will immediately snap over the end of said arm, this position of the parts being shown in Fig. 8. As soon as it has drawn the catches 51 downward the cross-head thereafter rises out of contact with the hooks 52, which relation of parts as the cross-head starts up is also shown in Fig. 8; and the spring 67 simultaneously forces the slide pin 65 upward, forcing the cross pin 50 into engagement with the stop block 44, thereby throwing the catches 51 outward and moving their hooks 52 from under the lower edge of the cross-head 29, which breaks the interlocking connection between the plunger 41 and the cross-head 29, and causes the parts to assume the relation shown in Fig. 6.

Whenever the operator releases pressure on the foot bar 39 the springs 76 draw the pull bars upward, thereby raising the plunger 41 and carrying the double dog 59 upward, in which movement the hook 61 engages the under side of the latch 57 and raises the same, as shown in Fig. 6, and after passing above the said latch will fall to its normal position, or to that shown in Fig. 2. When the foot bar 39 is released and drawn upward the treadle 16 is of course also released, to permit the clutch members to be disengaged after one cycle of movement, in the manner previously described.

In the operation of trimming the scraps of leather by means of shears 77 and 81 referred to above, the operator inserts the scrap of leather in the space between the shears and then when the leather is properly positioned he simply depresses the treadle 16. This operates in the manner described above to cause the engagement of the clutch teeth 7 and 9, whereupon the shaft will rotate and the cross-head 29 will descend, thereby operating the movable blades 81. Upon release of the treadle 16 its hooked end 15 will fall by gravity on the cam ring 10 to provide for the automatic disengagement of the clutch members, as previously described. Should the operator inadvertently hold the treadle 16 continuously depressed no harm will be done as the cross-head 29 will simply continue to reciprocate without engaging the hooks 52; the blades 81 will be operated, but not the cutting block.

One of the principal advantages of the foregoing arrangement is that any object only slightly thicker than a lift if inserted under the cutting block will prevent the plunger 41 being lowered sufficiently to permit the hooks 52 to engage under the cross-head 29. Therefore, should the operator inadvertently insert his finger between the die and the cutting block he would incur no greater injury at best than a hard squeeze or perhaps a slight cut on the finger, dependent on the pressure applied to the foot piece 39. His safety in this regard is further secured by the fact that there is no possibility of the cutting block descending on the die when the shears 77 or 81 are being used, through the agency of the treadle 16; and in actual operation the cutting block will descend on the die only at such times as the operator causes this to take place by pressing down the foot piece 39. And after having once pressed down the foot piece 39 he is compelled to release it and permit the plunger 41 to rise in order to re-set the catches to engage the cross-head as above described before the cutting block can again be made to descend into contact with the die.

The operator continues to cut lifts in the manner above described, and the operation of cutting results in gradually forcing the lifts downward into the holder formed by the breast-plate 71 and the back-plate 72 to form a continuous log. As the interior of the holder is unobstructed throughout its entire length, this log passes downward uninterruptedly through the machine, and through an opening in the floor under the machine, if desired; and, as well understood in the art, it may be continued to be built up to any desired length before sections thereof are separated from the log to be cut up by a suitable machine into heel blank sizes.

It is obvious that, as in the case of the prior machine referred to, heel blanks may be made by the present machine instead of a continuous log by simply interposing separating plates, or the like, between the lifts when sufficient lifts have been cut into the die to form a heel blank of the desired height.

The operation of building the heel-blanks need not be referred to at more length, as it is described in the application of Wolfe and Parks above referred to, and also in Letters Patent granted to William Wolfe and Dennis Parks, for a method of building heel blanks, No. 1,157,355, dated October 19th, 1915.

In order for the operator to determine the thickness of the lift cut, and also to enable him to build heel-blanks of uniform height, I may employ the gage mechanism which will now be described.

Pivotally mounted on the under side of the work table 35 is a bell crank lever 89 having a short arm 90 normally pressed downward by a spring 91 and having a relatively long arm 92 pivotally connected at its lower end intermediate the ends of a lever arm 93. The latter is pivotally connected at its outer end to the lower end of a vertically-disposed rod 94 which passes upward through suitable bearings 95 supported on the column 27, and has at its upper end a pointer 96. The column 27 has secured on its upper end a vertically-disposed gage 97 having suitable graduation marks thereon. The lever arm 93 has a free end extending inward between the plates 71 and 72, which form the holder, and such free end is provided with a curved shoe 98 which is in a position to be engaged by the lifts or the heel-blanks as they are forced downward in the holder. It will be seen that as each heel-blank moves down in the holder it will carry the curved shoe 98 with it, and raise the outer end of the lever arm 93, which, in turn, will raise the rod 94 and pointer 96. As the end of the latter lies in juxtaposition to the scale on the gage 97 the operator, by observing the latter, can see the thickness of the lift which has been cut, and as he knows the height to which the heel-blank is to be built he will not only be able to ascertain when this desired height has been reached by observing the scale, but he will also be assisted in selecting the proper thickness of leather to be used in cutting the last lift, or the last two lifts, in order to bring the height of the heel-blank to the desired standard.

I claim:

1. In a machine of the class described, the combination of a die, a reciprocable member, a depressible member carrying a cutting block, a one-revolution clutch for actuating said reciprocable member, a manually actuated member for moving said depressible member, interlocking means for automatically interlocking said depressible member with said reciprocable member when said depressible member is moved by said manually actuated member to enable said reciprocable member to reciprocate said cutting block, and means for closing said one-revolution clutch operated by said manually actuated member when the latter is actuated.

2. In a machine of the class described, the combination of a die, a reciprocable member, a depressible member carrying a cutting block, a one-revolution clutch for actuating said reciprocable member, a manually actuated member for moving said depressible member, interlocking means for automatically interlocking said depressible member with said reciprocable member when said depressible member is moved by said manually actuated member to enable said reciprocable member to reciprocate said cutting block, means for closing said one-revolution clutch operated by said manually actuated member when the latter is actuated, and automatic means for breaking the interlocking connection between said depressible member and said reciprocable member during each reciprocation of said reciprocable member.

3. In a machine of the class described, the combination of a frame, a transversely disposed driving shaft, an elevated die supported on said frame out of alinement with said shaft, a reciprocable cross head, a cutting block to be actuated by said cross head and thereby coöperate with said die, rocking levers pivotally supported on said frame and connected with said shaft so as to be rocked when said shaft rotates, connecting rods connecting said levers with said cross-head, and a straight holder for the blanks in alinement with said die and cutter block, and operating to conduct the blanks from the die continuously and uninterruptedly in a line extending past and to the side of said shaft.

4. In a machine of the class described, in combination with a die, a reciprocable member, a cutting block movable independently of and also in conjunction with said reciprocable member, the conjoint movement being effective to carry the cutting block into contact with the cutting die, and means for automatically imparting a single reciprocation to said reciprocable member at the will of the operator.

5. In a machine of the class described, in combination with a die, a reciprocable member, a depressible member carrying a cutting block, means for automatically effecting engagement between said depressible and reciprocable members when the former has been lowered a predetermined distance, to cause the cutting block to be carried into contact with the die by the reciprocable member, a drive shaft, a continuously rotating member, automatic clutch mechanism for connecting said rotatable member with said shaft, and a releasing device for said clutch, said depressible member being adapted to actuate the clutch release when moved the distance sufficient to permit engagement between it and said reciprocable member.

6. In a machine of the class described, in combination with a die, a reciprocable member, cutting mechanism adapted to be actuated by said reciprocable member, a depressible member carrying a cutting block, means for automatically effecting engagement between said depressible and reciprocable members when the former has been lowered a predetermined distance, to cause the cutting block to be carried into contact with the die by the reciprocable member, a drive shaft operatively connected with said reciprocable member to actuate the latter, a continuously rotated member, automatic clutch mechanism for effecting connection between the drive shaft and said rotating member, and a releasing lever controlling said clutch and adapted to be independently operated to release said clutch and thereby effect actuation of the cutting mechanism independently of any other operation of the machine.

7. In a machine of the class described, in combination with a die, a reciprocable member, cutting mechanism adapted to be actuated by said reciprocable member, a depressible member carrying a cutting block, means for automatically effecting engagement between said depressible and reciprocable members when the former has been lowered a predetermined distance, to cause the cutting block to be carried into contact with the die by the reciprocable member, a drive shaft operatively connected with said reciprocable member to actuate the latter, a continuously rotating member, automatic clutch mechanism for effecting connection between the drive shaft and said rotating member, a releasing lever controlling said clutch and adapted to be independently operated to release said clutch and thereby effect actuation of the cutting mechanism independently of any other operation of the machine, and means carried by said depressible member for actuating said releasing lever when the depressible member has been moved the distance necessary to permit engagement between it and said reciprocable member.

8. In a machine of the class described, in combination with a die for cutting blanks, a reciprocable member, a cutting block movable independently of and also in conjunction with said reciprocable member, the conjoint movement being effective to carry the cutting block into contact with the cutting die, a driving shaft located out of line with said die, a straight holder for conducting the blanks uninterruptedly in a continuous log, lever mechanism pivotally mounted on the machine and to which said reciprocable member is operatively connected, and means operatively connecting said lever mechanism with said driving shaft whereby when the latter is operated said lever mechanism will cause the reciprocation of said reciprocable member.

In testimony whereof I have hereunto set my hand.

JOHN E. MITCHELL.

Copies of this patent may be obtained for five cents each, by addressing the "Commissioner of Patents, Washington, D. C."